United States Patent
Oroskar et al.

(10) Patent No.: US 9,572,167 B1
(45) Date of Patent: Feb. 14, 2017

(54) ASSIGNING RADIO RESOURCES TO A WIRELESS COMMUNICATION DEVICE THAT EXPERIENCED A CALL DROP

(71) Applicant: Sprint Spectrum L.P., Overland Park, KS (US)

(72) Inventors: Siddharth S. Oroskar, Overland Park, KS (US); John W. Prock, Peculiar, MO (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 64 days.

(21) Appl. No.: 13/792,677

(22) Filed: Mar. 11, 2013

(51) Int. Cl.
*H04W 72/00* (2009.01)
*H04W 72/04* (2009.01)

(52) U.S. Cl.
CPC ................ *H04W 72/0493* (2013.01)

(58) Field of Classification Search
CPC .... H04W 28/26; H04W 72/04; H04W 72/044; H04W 72/12; H04W 76/028; H04W 88/08; H04B 7/26; H04B 7/2659
USPC ............................ 455/452.1, 466, 509, 432.1
See application file for complete search history.

(56) References Cited

U.S. PATENT DOCUMENTS

| | | | |
|---|---|---|---|
| 6,049,721 A * | 4/2000 | Serizawa ................. | H04B 7/26 455/509 |
| 6,249,681 B1 * | 6/2001 | Virtanen ....................... | 455/466 |
| 6,771,621 B1 * | 8/2004 | Lee .................... | H04W 36/0072 370/322 |
| 8,391,858 B1 * | 3/2013 | Vargantwar ......... | H04W 36/245 370/328 |
| 8,565,759 B1 * | 10/2013 | Oroskar ..................... | 455/432.1 |
| 2002/0068586 A1 * | 6/2002 | Chun et al. ................... | 455/458 |
| 2004/0125768 A1 * | 7/2004 | Yoon et al. .................... | 370/331 |
| 2006/0274685 A1 * | 12/2006 | Johnson et al. .............. | 370/328 |

* cited by examiner

*Primary Examiner* — Lester Kincaid
*Assistant Examiner* — Gary Lafontant

(57) ABSTRACT

A method, system, and apparatus for assigning resources to a wireless communication device that experienced a call drop. A RAN may receive an origination request from a mobile station and make a first determination that within a predetermined amount of time prior to receiving the origination request the mobile station experienced a call drop. Responsive to making the first determination, the RAN may make a second determination that the RAN should allocate a first extent of resources to the mobile station rather than allocating a second extent of resources to the mobile station. The first extent of resources may be less than the second extent of resources. Responsive to making the second determination, the RAN may allocate the first extent of resources to the mobile station in response to the origination request rather than allocating the second extent of resources to the mobile station in response to the origination request.

20 Claims, 3 Drawing Sheets

ASSIGNING RADIO RESOURCES TO A WIRELESS COMMUNICATION DEVICE THAT EXPERIENCED A CALL DROP

BACKGROUND

Unless otherwise indicated herein, the materials described in this section are not prior art to the claims and are not admitted to be prior art by inclusion in this section.

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. In a typical arrangement, a base station of a RAN may radiate to define a wireless coverage area in which mobile stations (such as cell phones, tablet computers, tracking devices, embedded wireless modules, and other wirelessly equipped communication devices) can operate. In turn, each base station is typically coupled with one or more transport networks, such as the public switched telephone network (PSTN) and/or the Internet for instance. With this arrangement, a mobile station operating within a coverage area of a base station can engage in air-interface communication with the base station and can thereby communicate via the base station with various remote network entities or with other mobile stations.

In practice, communications over the air-interface between a base station and a mobile station are structured in accordance with a particular air-interface protocol or "radio access technology," with communications from the base station to mobile stations defining a "forward link" (or downlink) and communications from the mobile stations to the base station defining a "reverse link" (or uplink). Numerous such protocols are well known in the art, and others may be developed in the future. Examples of existing protocols include CDMA (e.g., 1×RTT, 1× Advanced, 1×EV-DO), LTE, WiMAX, iDEN, TDMA, AMPS, GSM, GPRS, UMTS, EDGE, microwave, satellite, MMDS, Wi-Fi (e.g., IEEE 802.11), and Bluetooth. Each protocol may define its own procedures for initiation of calls, handoff between coverage areas, and functions related to air-interface communication.

Within the context of a RAN, the term "base station" is sometimes used to describe simply a device known as a base transceiver station (BTS), which contains the hardware, antennas, and so forth that actually conduct the over-the-air portion of the communication with the mobile station on behalf of the RAN. At times, however, the term "base station" is used to refer to a combination of (i) one or more BTSs and (ii) a device known as a base station controller (BSC) (or radio network controller (RNC)), which controls the BTS(s) and connects it (them) to the rest of the network. Further, a base station may encompass functions of one or more other RAN entities as well.

In a typical scenario, a mobile station registers with a RAN via a particular BTS, and then operates in what is known as "idle mode" on a carrier frequency in a coverage area provided by that BTS. If another telephone, computer, or other communication device attempts to contact the mobile station, the RAN will typically send the mobile station a page message via at least that particular BTS. The mobile station may respond by requesting and establishing communication on what is known as an air-interface traffic channel (or simply a traffic channel), and proceed to conduct the relevant communication. In other instances, the mobile station may itself originate a communication, in which case the mobile station sends the RAN an origination request in order to request and establish communication on a traffic channel to conduct the relevant communication. In either scenario, after the RAN has established a radio link and allocated a traffic channel for use by the mobile station, the mobile station is said to be operating in what is known as an active/connected mode.

If a mobile station loses communication with the network when the mobile station is engaged in a call in the active/connected mode, the mobile station may experience a call drop. This may happen, for example, if the mobile station is active/connected in a single coverage area and loses communication with the base station serving that coverage area, or if the mobile station is active/connected in multiple coverage areas at once and loses communication with the one or more base stations serving those coverage areas. In practice, when a mobile station experiences a call drop, the mobile station may responsively scan for coverage once again and a user of the mobile station may manually re-originate the call. Alternatively, some air-interface protocols include a call recovery feature that facilitates reconnecting communications automatically without manual intervention from a user when a mobile station experiences a call drop.

OVERVIEW

Disclosed herein is a method and corresponding apparatus or system that may allow a RAN to conserve radio resources by avoiding assignment of extraneous radio resources to a mobile station that has recently experienced a call drop. In a scenario in which a mobile station has recently experienced a call drop, the chances of experiencing a subsequent call drop in a reconnected call may be relatively high. For that reason, when assigning radio resources in response to receiving an origination request from the mobile station, a RAN can conserve radio resources by avoiding assignment of extraneous resources to such a mobile station. The RAN may then allocate any conserved resources to other originating mobile stations that may be seeking to establish communication.

Accordingly, in one respect, disclosed is a method that may be implemented by a RAN in a wireless communication system. The disclosed method may involve the RAN receiving an origination request from a mobile station. Further, the method may involve the RAN making a first determination that within a predetermined amount of time prior to receiving the origination request the mobile station experienced a call drop. The method may then involve, responsive to making the first determination, the RAN making a second determination that the RAN should allocate a first extent of resources to the mobile station rather than allocating a second extent of resources to the mobile station. The first extent of resources may be less than the second extent of resources. Additionally, the method may involve, responsive to making the second determination, the RAN allocating the first extent of resources to the mobile station in response to the origination request rather than allocating the second extent of resources to the mobile station in response to the origination request.

In another respect, disclosed is a system in a RAN. The system may include a processor, data storage, and program instructions stored in the data storage that are executable by the processor to carry out functions. The functions may include: (i) receiving an origination request from a mobile station, (ii) making a first determination that within a predetermined amount of time prior to receiving the origination request the mobile station experienced a call drop, (iii) responsive to making the first determination, making a second determination that the RAN should allocate a first extent of resources to the mobile station rather than allocating a second extent of resources to the mobile station, and (iv) responsive to making the second determination, allocating the first extent of resources to the mobile station in response to the origination request rather than allocating the second extent of resources to the mobile station in response to the origination request. The first extent of resources may be less than the second extent of resources.

Further, in still another respect, disclosed is a non-transitory computer readable medium having stored thereon instructions executable by a processing unit to carry out functions. By way of example, the functions may include receiving an origination request from a mobile station, and making a first determination that within a predetermined amount of time prior to receiving the origination request the mobile station experienced a call drop. Further, the functions may include, responsive making the first determination, making a second determination that a RAN should allocate a first extent of resources to the mobile station rather than allocating a second extent of resources to the mobile station. The first extent of resources may be less than the second extent of resources. Additionally, the functions may include, responsive to making the second determination, allocating the first extent of resources to the mobile station in response to the origination request rather than allocating the second extent of resources to the mobile station in response to the origination request.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
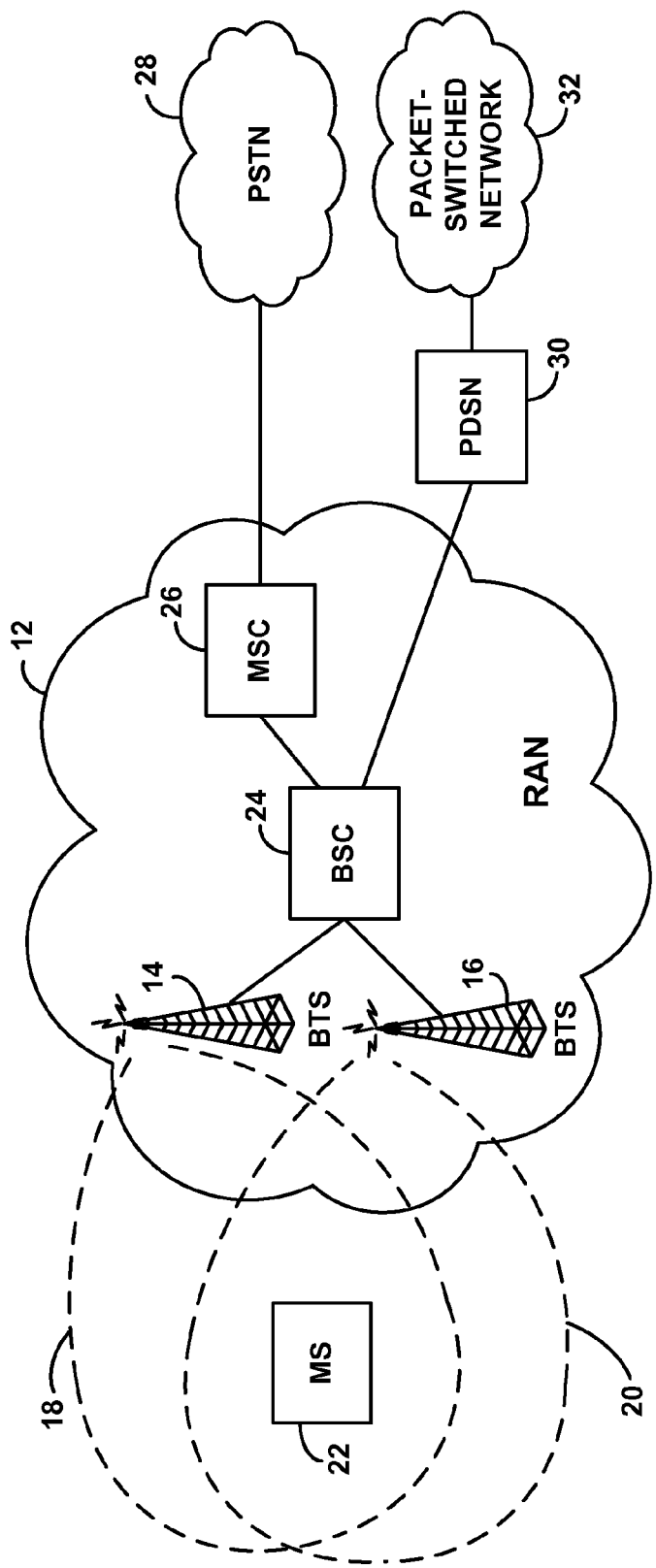
FIG. 1 is a simplified block diagram of an example communication system in which the method can be implemented.

For illustration, portions of the present method will be described with respect to communications of the CDMA2000 family (e.g., 1× Advanced). It should be understood, however, that part or all of the method may apply equally to other air-interface protocols in which radio resources are allocated to mobile stations.

Referring to the drawings, as noted above, FIG. 1 is a simplified block diagram of an example communication system in which the present method can be implemented. It should be understood, however, that this and other arrangements described herein are provided as examples only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

As shown in FIG. 1, the example system includes at its core a RAN 12 having two representative BTSs 14, 16 that each radiate to define a corresponding air-interface coverage area. By way of example, BTS 14 is shown radiating to define a coverage area 18, while BTS 16 is shown radiating to define a coverage area 20. The coverage areas 18, 20 of BTSs 14, 16 are shown overlapping in part, to allow for handoff as a mobile station moves from one coverage area to another as well as other processes described further below. Although two representative BTSs are shown, RAN 12 could include more or less BTSs cooperatively defining one or multiple coverage areas.

In practice, RAN 12 may be arranged to serve one or more mobile stations within the coverage areas 18, 20. By way of example, shown operating within the coverage areas is a representative mobile station 22. The mobile stations can take any of a variety of forms suitable for being served by RAN 12 and, particularly, being provided with wireless communication service by RAN 12. For example, mobile stations can be cellular telephones, wirelessly equipped tablet computers, wirelessly equipped personal computers, wirelessly equipped gaming systems, wirelessly equipped embedded telemetry devices (e.g., machine-to-machine devices), or other wirelessly equipped devices now known or later developed. Notwithstanding their title, these devices need not be movable but are considered to be "mobile" because they can engage in cellular wireless communication at various locations.

BTSs 14, 16 are shown coupled with a BSC 24, which may function to control various BTS operations as well as aspects of air-interface operation such as handoff of calls between coverage areas. BSC 24 is then shown coupled with an MSC 26, which provides connectivity with the PSTN 28, and BSC 24 is further shown coupled with a packet data serving node (PDSN) 30, which provides connectivity with a packet-switched network 32 such as the Internet for instance. With this arrangement, mobile station 22 may engage in air-interface communication with one or more of BTSs 14, 16 and may thereby communicate via the BTSs with various network entities on the PSTN or packet-switched network or with other mobile stations served by the BTSs.

To facilitate providing wireless communication service, BTSs 14, 16 may wirelessly broadcast one or more pilot or reference signals that mobile stations can detect as an indication of the presence of the BTSs. Upon detecting such a signal broadcast by BTS 14 or BTS 16, a mobile station may engage in air-interface communication with the BTS to register with the RAN. The mobile station may then initiate communications via the system. For instance, the mobile station may send an air-interface communication request to the system, seeking to engage in bearer communication via the system, the system may assign air-interface traffic channel resources for the requested communication, and the mobile station may proceed to engage in the communication.

Generally, an air-interface traffic channel resource may be a dedicated portion of bandwidth that a RAN designates for use by a particular mobile station. For example, an air-interface traffic channel resource may be a radio-based communication link or connection that a mobile station uses to communicate with a BTS. Further, each air-interface traffic channel resource may be defined by a particular frequency, time slot, and/or code.

In one example, an air-interface traffic channel resource may be a forward link or reverse link traffic channel over which a mobile station communicates with a BTS. For instance, the mobile station may communicate with a BTS on a traffic channel that is defined by a given frequency and a given encoding structure. As a specific example, in a conventional CDMA wireless network compliant with the well-known IS-2000 standard, each cell sector employs one or more carrier frequencies, typically 1.25 MHz in bandwidth each, and each wireless service sector is distinguished from adjacent sectors by a pseudo-noise code time offset (PN offset). Further each, cell sector can concurrently communicate on multiple different channels, distinguished from each other by "Walsh codes." When a mobile station operates in a given cell sector, communications between the mobile station and the BTS of the cell sector are carried on a given frequency and are encoded by the sector's PN offset and a given Walsh code.

Further, in an IS-2000 system, data is transmitted in units of frames on both the forward link and reverse link. On either link, there are a limited number of traffic channels for communications in a given wireless service sector. On the forward link, for example, communications are encoded with the sector's PN offset and a given Walsh code. Certain Walsh codes are reserved for use to define control channels, including a pilot channel, a sync channel, and one or more paging channels, and the remainder can be assigned dynamically for use as traffic channels, i.e., to carry user communications.

Optimally, some or all aspects of the method will be implemented when RAN 12 receives an origination request from a mobile station that is located in one of coverage areas 18, 20. For instance, the method may be implemented when RAN 12 receives an origination request from a mobile station that recently experienced a call drop.

After RAN 12 has established a radio link and allocated a traffic channel for use by a mobile station, the mobile station is said to be operating in what is known as an active/connected mode. When the mobile station is engaged in a call in the active/connected mode, if the mobile station loses communication with the network, the mobile station may experience a call drop. This may happen if the mobile station is active/connected in a single coverage area and loses communication with a BTS serving that coverage area, or if the mobile station is active/connected in multiple coverage areas at once and loses communication with the one or more BTSs serving those coverage areas. The call at issue can be a voice call (e.g., a call placed over PSTN 28), a data call (e.g., a wireless packet data session for HTTP, SIP, VoIP, media streaming, etc. placed over packet-switched network 32, often referred to as a "call"), or some other type of call that will use air-interface traffic channel resources in the coverage area.

A RAN may detect a call drop in various ways. By way of example, when a call ends normally with a mobile station ending the call (e.g., with a user of a mobile station pressing an "end" button) or the other end of the call ending the call, a BSC may normally send or receive an end-of-call signal or the like. If communication between the mobile station stops without such an end-of-call signal, a BTS, and in turn the BSC, may conclude that the call was dropped. The BSC may also record an identity of the mobile station and a time of the call drop in a database or log.

In practice, a mobile station may drop a call upon expiration of a fade timer. A fade timer is a timer kept by the mobile station as a measure of forward traffic channel continuity. The mobile station may continually monitor signals received on a forward traffic channel and determine a ratio of errored frames to total frames, or frame error rate (FER). If the FER exceeds a threshold, the mobile station may start the fade timer. Subsequently, if the FER does not improve and the fade timer expires, the mobile station drops the call.

The manner in which a subsequent origination request is transmitted to reconnect the call can vary depending on whether RAN 12 supports a call recovery feature.

In one example scenario, when mobile station 22 drops a call, a user of the mobile station may manually intervene to re-originate the call. Upon receiving a request from the user to reconnect the call, mobile station 22 may responsively scan for coverage once again to re-originate the call. If mobile station 22 detects a pilot signal of sufficient strength from BTS 14, mobile station 22 may report the pilot signal strength to BTS 14 in an origination message. The pilot signal strength may be the signal to noise ratio at which mobile station 22 receives the pilot signal for instance. Upon receipt of the origination request, BTS 14 may then signal to BSC 24, and BSC 24 may in turn signal to MSC 26. At the instruction of MSC 26, BSC 24 and/or BTS 14 may select and assign a traffic channel resource to be used for traffic channel communication in the call. And then BTS 14 may transmit an enhanced channel assignment message (ECAM) on an air-interface paging channel to mobile station 22, directing mobile station 22 to use the selected traffic channel resource for the call.

In another example scenario, a communication system may include a call recovery feature that facilitates reconnecting communications automatically, without manual intervention from a user, when a mobile station experiences a call drop. For example, in a CDMA2000 1× Advanced system, BTS 14 may notify mobile station 22 that BSC 24 and BTS 14 support call recovery by transmitting a CRRM_MSG_IND to mobile station 22 in an overhead message. If mobile station 22 later experiences a call drop, mobile station 22 may transmit a call recovery request message (CRRM) to BTS 14 within a predetermined amount of time (e.g., twenty seconds) of experiencing the call drop. In response to receiving the CRRM, BSC 24 and/or BTS 14 may select and assign a traffic channel resource to be used to reconnect the call. And then BTS 14 may transmit an ECAM on an air-interface paging channel to mobile station 22, directing mobile station 22 to use the selected traffic channel resource to reconnect call.

In some examples, RAN 12 may also engage in an access handoff (AHO) process and/or a channel assignment into soft handoff (CASHO) process when allocating traffic channel resources to a mobile station.

AHO may involve a RAN sending multiple ECAMs to a mobile station to increase the likelihood that the mobile station receives a channel assignment. In an example scenario, BTS 14 may be configured to define wireless coverage area 18 with PN offset 1 ("PN 1") and BTS 16 may be configured to define wireless coverage area 20 with PN offset 2 ("PN 2"). Further, mobile station 22 may be able to receive pilot channel signals of sufficient strength from both PN 1 and PN 2 such that mobile station 22 could communicate effectively via either of the these wireless coverage areas. Mobile station 22 may report to BSC 24 measurements of the signal strengths at which mobile station 22 receives the pilot channels of PN 1 and PN 2.

If mobile station 22 sends an origination request (e.g., an origination message or a CRRM) to BSC 24, BSC 24 may then use pilot signal strength measurements received from mobile station 22 to make a traffic channel assignment. For example, BSC 24 may determine that mobile station 22 receives the pilot signal from PN 1 at a higher strength than that of PN 2, and based on the determination, decide to assign a traffic channel from PN 1 to mobile station 22. BSC 24 may then transmit multiple ECAMs to the mobile station that each includes a traffic channel assignment for PN 1. For example, BSC 24 may transmit a first ECAM via BTS 14 instructing mobile station 22 to use a particular Walsh code to receive from PN 1. Similarly, the BSC may also substantially simultaneously transmit a second ECAM via BTS 16 instructing the mobile station to use a particular coded traffic channel to receive from PN 2 (thus, these two ECAMs may serve to assign the same channel). By transmitting multiple ECAMs to mobile station 22 via different wireless coverage areas, the likelihood that the mobile station receives at least one of these messages is increased.

CASHO may involve a RAN assigning multiple traffic channels to a mobile station when a call is initialized. Continuing with the example scenario from above, when mobile station 22 sends an origination request (e.g., an origination message or a CRRM) to BSC 24, the origination request may carry data that specifies or otherwise indicates the pilot signal strength that mobile station 22 detected for each of the strongest pilot signals mobile station 22 detected (including those for coverage area 18 and coverage area 20). In response to receiving the origination request, BSC 24 may assign one traffic channel from coverage area 18, and another traffic channel from coverage area 20, to mobile station 22, in accordance with CASHO procedures. When making the traffic channel assignment, BSC 24 may consider pilot signal strength measurements that it received from mobile station 22, as a basis to determine which coverage areas to include in the CASHO process. In this example, it is assumed that BSC 24 determines the pilot signal strengths detected by mobile station 22 in coverage areas 18 and 20 are both sufficient, and so BSC 24 may programmatically decide to use CASHO to assign traffic channels to mobile station 22 simultaneously in both coverage areas 18 and 20.

In response to deciding to use CASHO, BSC 24 may transmit an ECAM via BTS 14 and/or BTS 16 to mobile station 22. The ECAM may include traffic channel assignments for both coverage area 18 and coverage area 20. For instance, the ECAM may instruct mobile station 22 to use a particular coded or otherwise identified traffic channel to communicate with the RAN in coverage area 18 and another particular coded or otherwise identified traffic channel to communicate with the RAN in coverage area 20.

Accordingly, mobile station 22 may then begin transmitting and receiving bearer data via both BTS 14 (coverage area 18) and BTS 16 (coverage area 20). Thus, via both BTS 14 and BTS 16, mobile station 22 may receive forward direction bearer data streams from BSC 24, and may combine these streams into a single stream of bearer data. This combining may involve mobile station 22 adding the signals it receives from BTS 14 and BTS 16, to form a combined signal, or selecting the best of those signals on a per frame basis or the like. Conversely, via both BTS 14 and BTS 16, BSC 24 may receive reverse direction bearer data streams from mobile station 22, and may also combine or otherwise process those streams into a single stream of bearer data.

Substantially simultaneous communication using AHO and CASHO procedures may improve the reliability of communication involving mobile station 22. For instance, call quality may increase and fewer calls may fail. However, as described, AHO and CASHO procedures may involve each mobile station using multiple CDMA resources of a RAN during a call. As the number of mobile stations and calls increase, allocating multiple resources to each mobile station may deplete the CDMA air-interface resources of the RAN. Further, more generally, even without using AHO and/or CASHO procedures, as the number of mobile stations and calls increase, allocating multiple traffic channels to each mobile station may deplete the air-interface resources of the RAN. Such depletion may cause further calls relating to other mobile stations to fail since there may not be any air-interface resources available to assign to the other mobile stations.

In practice, a RAN may have a limited amount of resources to allocate to mobile stations. For example, in an IS-2000 system, the number of available Walsh codes may limit the number of air-interface traffic channels available for voice calls or data calls. As noted above, the present method provides a way for a RAN to conserve radio resources by avoiding assignment of extraneous resources to a mobile station that has recently experienced a call drop.

Figure 2:
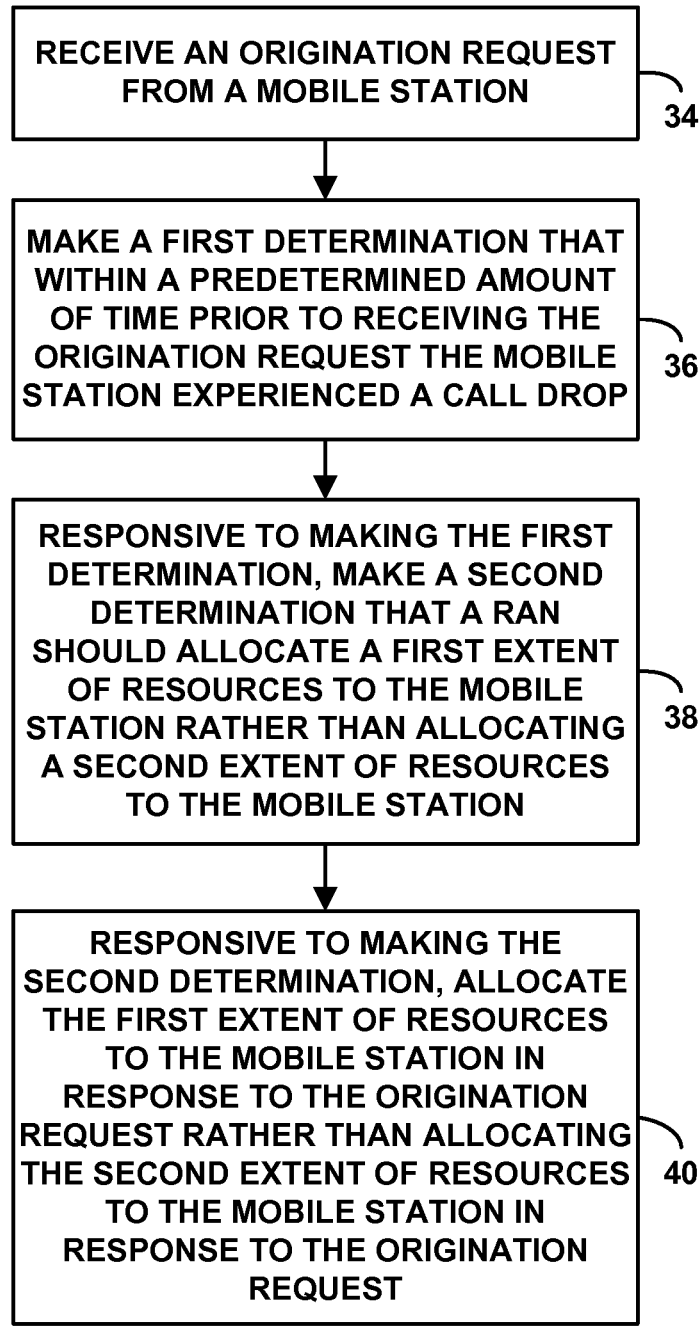
FIG. 2 is a flow chart depicting a set of functions that can be carried out in accordance with the method.

One example method may be implemented by a RAN in a wireless communication system. FIG. 2 is a flow chart depicting more particularly a set of functions that can be carried out in accordance with the example method.

In practice, the functions described herein may be implemented at one or more of the BTSs 14, 16, at BSC 24, and/or at any other component of RAN 12. Each such component will preferably include a processing unit (e.g., one or more general purpose processors and/or dedicated processors), data storage (e.g., one or more volatile and/or non-volatile storage components) containing program logic executable by the processor to carry out functions described herein, and a network connection mechanism to facilitate communication with other components of the system. Alternatively, the method could be implemented at least in part by other types of logic, such as hardware logic for instance. Other implementation mechanisms are possible as well.

As shown in FIG. 2, at block 34, the method may involve receiving an origination request from a mobile station. In one example, the function at block 30 may involve a BTS receiving an origination request that is transmitted to a BSC via the BTS. For instance, the mobile station may wirelessly transmit the origination request to the BTS over an access channel, and the BTS may then provide an indication of the received origination request to the BSC. The origination request may be a request to engage in a call with another party (e.g., another party that is served by the RAN, another party that is served by a different RAN, or perhaps another party on a transport network to which the RAN is communicatively linked).

As one particular example, the origination request may be a CRRM that is provided by a mobile station after a fade timer has expired. As another example, the origination request may be an origination message that is provided by a mobile station that has recently experienced a call drop. In either scenario, the origination request may also optionally include data identifying pilot signal strengths for each of one or more pilot signals detected by the mobile station.

As shown at block 36, the method may involve making a first determination that within a predetermined amount of time prior to receiving the origination request the mobile station experienced a call drop.

In an example in which the RAN supports a call recovery feature, the predetermined amount of time may be an amount of time during which a mobile station may transmit a CRRM after experiencing a call drop. For example, the mobile station may be configured to transmit a CRRM to a BTS within twenty seconds of experiencing a call drop. It may be assumed that if the mobile station transmits a CRRM, the mobile station experienced a call drop within the predetermined amount of time. Thus, making the first determination may simply involve a BSC and/or BTS identifying that the origination request is a CRRM.

Alternatively, in an example in which the origination request comprises an origination message, a BSC may make the first determination by determining that a record of call drops stored by the RAN indicates that the mobile station experienced a call drop within the predetermined amount of time prior to receiving the origination message. In practice, a BSC (or other RAN component) may maintain a record of call drops. Such a record may identify the identity of particular mobile stations that experience call drops as well as the time at which the call drop occurred. To make the first determination, a BSC may determine an identity of the mobile station that provided the origination request and determine a time that the origination request was provided. The BSC may then query the record of call drops to determine if the particular mobile station that provided the origination request has experienced a call drop within a predetermined amount of time (e.g., 20 seconds) prior to the time when the origination request was provided. For instance, if the origination request was provided by a mobile station at 12:12:24, the BSC may query the record of calls to determine whether the mobile station experienced a call drop between 12:12:04 and 12:12:24.

Continuing with reference to FIG. 2, at block 38, the method may then involve responsive to making the first determination, making a second determination that a RAN should allocate a first extent of resources to the mobile station rather than allocating a second extent of resources to the mobile station. Resources of the first extent of resources and second extent of resources may be air-interface traffic channel resources for instance. Generally, the first extent of resources may be less than the second extent of resources. For example, the first extent of resources may include a first number of particular coded or otherwise identified traffic channels while the second extent of resources may include a second number of particular coded or otherwise identified traffic channels that is greater than the first number.

In practice, a RAN may have a normal or default extent of resources that the RAN allocates to mobile stations in response to receiving an origination request. For instance, if BTSs of the RAN are configured to use AHO and CASHO processes, the RAN may, by default, be configured to send multiple ECAMs with multiple traffic channel resources. However, the RAN may be able to allocate a lesser extent of resources by not engaging in AHO and CASHO processes. Accordingly, if a BSC has made the first determination, then responsive to making the first determination, the BSC may determine that the RAN should allocate the lesser extent of resources by not engaging in AHO and CASHO processes.

As a particular example, mobile station 22 may have recently experienced a call drop and transmitted an origination request to RAN 12. If mobile station 22 detected pilot signals from each of BTS 14 and BTS 16 that were of sufficient strength to receive data from the respective BTS, the origination request may include pilot signal strengths for each of BTS 14 and BTS 16. If BSC 24 determines that mobile station 22 did not recently experience a call drop, BSC 24 may determine that it should allocate resources associated with each of BTS 14 and BTS 16 (e.g., according to a AHO and/or CASHO process). If, however, BSC 24 determines that mobile station 22 recently experienced a call drop, the BSC 24 may instead allocate resources associated with a single one of BTSs 14, 16.

More generally, an origination request provided by a mobile station may indicate pilot signal strengths associated with a first number of BTSs (e.g., three separate BTSs), and responsive to making the first determination, the BSC may determine that the BSC should not allocate resources associated with each of the BTSs to the mobile station. For example, responsive to making the first determination, the BSC may determine that the BSC should allocate traffic channel resources associated with a second number of the BTSs, that is less than the first number, rather than allocating traffic channel resources associated with each of the BTSs.

As shown at block 36, the method may then involve responsive to making the second determination, allocating the first extent of resources to the mobile station in response to the origination request rather than allocating the second extent of resources to the mobile station in response to the origination request. In practice, allocating the first extent of resources to the mobile station in response to the origination request may involve a BSC reserving one or more traffic channels to be used by the mobile station and generating one or more channel assignment messages (e.g., ECAMs) which identify the one or more traffic channels. One or more BTSs may then send the one or more channel assignment messages to the mobile station. Each channel assignment message may identify one or more assigned traffic channels that the mobile station may use to communicate with a BTS.

In one scenario, if a BSC makes the second determination, the BSC may then direct a single BTS to transmit the channel assignment message(s) to the mobile station. In another scenario, in response to making the second determination, the BSC may direct multiple BTSs to each transmit channel assignment message(s) to the mobile station, but each channel assignment message may only identify a single traffic channel resource. Other scenarios may also exist. In an example in which a BSC determines that the RAN should not engage in a CASHO process and/or an AHO process when allocating resources to the mobile station, responsive to making the second determination, the BSC may not engage in a CASHO process and/or an AHO process when allocating resources to the mobile station.

In some instances, any resources of the second extent of resources that were not included in the first extent of resources may be allocated to other originating mobile stations.

Figure 3:
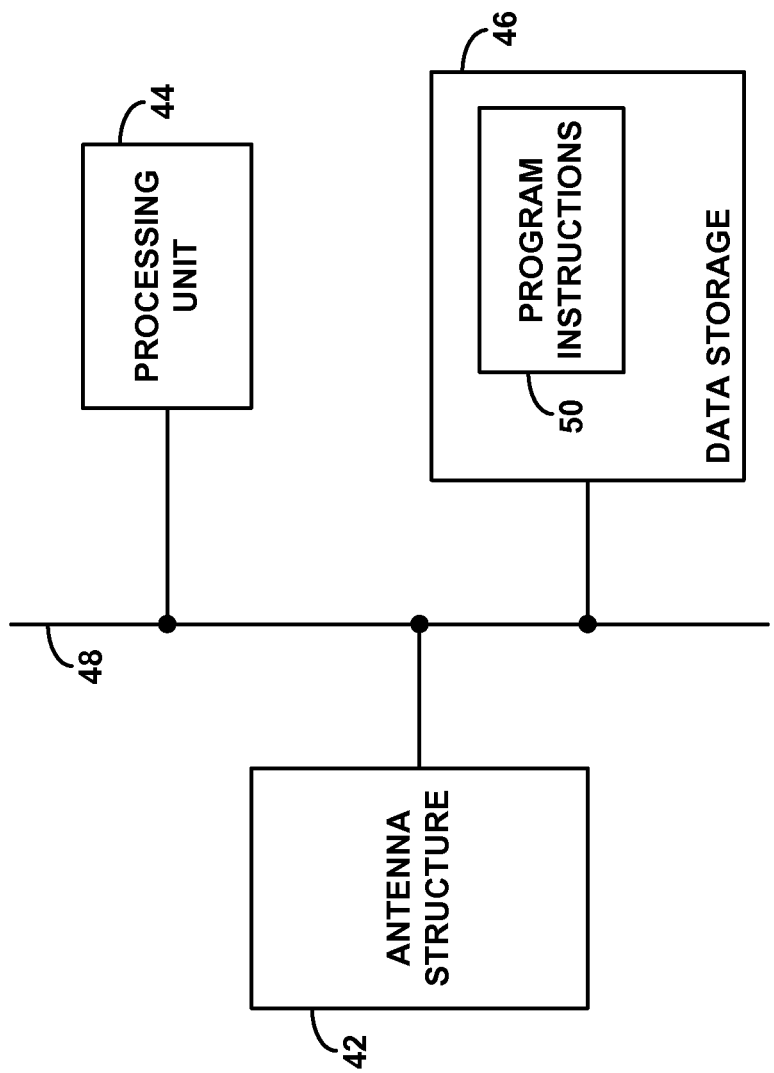
FIG. 3 is simplified block diagram depicting components of a RAN that may implement the method.

FIG. 3 is next a simplified block diagram depicting components of an example RAN arranged to implement this process. As shown, the example RAN includes an antenna structure 42, a processing unit 44 and data storage 46, all of which may be coupled together by a network or other connection mechanism 48. This arrangement may represent a macro network RAN, a femtocell, or other configuration.

Antenna structure 42 may comprise one or more antennas configured to engage in wireless communication with a mobile station as discussed above. In operation, the antenna structure may wirelessly receive an origination request from the mobile station. Further, in response to a determination by the RAN, the antenna structure may wirelessly transmit one or more channel assignment messages to the mobile station.

Processing unit 44 and data storage 46 may then cooperatively define a controller (though the controller could take other forms) that functions to determine whether the mobile station recently experienced a call drop, and, based on the determination, determine an extent of resources to allocate to the mobile station. As such, the processing unit 44 may comprise one or more general purpose processors (e.g., microprocessors) and/or one or more special purpose processors, and the data storage may comprise any type of non-transitory computer readable medium, which may include one or more volatile and/or non-volatile storage components, such as magnetic, optical, or flash storage. Data storage 46 could be integrated in whole or in part with the processing unit 44.

As shown, the data storage 46 may then hold program instructions (such as machine language instructions) 50 executable by the processing unit 44 to carry out various functions described herein. For instance, the program instructions may be executable by the processing unit to receive an origination request from a mobile station, and make a first determination that within a predetermined amount of time prior to receiving the origination request the mobile station experienced a call drop. Further, the program instructions may be executable by the processing unit to make a second determination, responsive to making the first determination, that the RAN should allocate a first (lesser) extent of resources to the mobile station rather than allocating a second (greater) extent of resources to the mobile station. Additionally, the program instructions may be executable by the processing unit to allocate, in response to making the second determination, the first extent of resources to the mobile station in response to the origination request rather than allocating the second extent of resources to the mobile station in response to the origination request.

An exemplary embodiment of the present method has been described above. Those of ordinary skill in the art will appreciate, however, that changes from the embodiment are possible, while remaining within the scope of the claims.

We claim:

1. A method implemented by a radio access network (RAN) in a wireless communication system, wherein the RAN comprises at least one base station radiating to define a first coverage area and a second coverage area, and wherein a mobile station is operating at a location where the first coverage area and the second coverage area overlap, the method comprising:
   the RAN receiving an origination request from the mobile station;
   in response to receiving the origination request, the RAN deciding whether to allocate to the mobile station resources associated with both the first coverage area and the second coverage area or rather to allocate to the mobile station resources associated with just the first coverage area or the second coverage area, wherein the decision is based on a determination of whether, within a predetermined amount of time prior to receiving the origination request, the mobile station experienced a call drop, wherein:
   (i) the RAN decides to allocate to the mobile station resources associated with both the first coverage area and the second coverage area if the determination is that, within the predetermined amount of time prior to receiving the origination request, the mobile station did not experience a call drop, and
   (ii) the RAN decides to allocate to the mobile station resources associated with just the first coverage area or the second coverage area if the determination is that, within the predetermined amount of time prior to receiving the origination request, the mobile station experienced a call drop, and
   in response to receiving the origination request, the RAN allocating resources to the mobile station in accordance with the decision.

2. The method of claim 1, wherein the RAN deciding whether to allocate to the mobile station resources associated with both the first coverage area and the second coverage area or rather to allocate to the mobile station resources associated with just the first coverage area or the second coverage area comprises the RAN deciding whether to send to the mobile station channel assignment messages for both the first coverage area and the second coverage area or rather to send to the mobile station a channel assignment message for just the first coverage area or the second coverage area.

3. The method of claim 1, wherein the RAN deciding whether to allocate to the mobile station resources associated with both the first coverage area and the second coverage area or rather to allocate to the mobile station resources associated with just the first coverage area or the second coverage area comprises the RAN deciding whether or not to engage in a Channel Assignment into Soft Handoff (CASHO) process with the mobile station.

4. The method of claim 1, wherein the RAN deciding whether to allocate to the mobile station resources associated with both the first coverage area and the second coverage area or rather to allocate to the mobile station resources associated with just the first coverage area or the second coverage area comprises the RAN deciding whether to allocate to the mobile station traffic channels for both the first coverage area and the second coverage area or rather to allocate to the mobile station a traffic channel from just the first coverage area or the second coverage area.

5. The method of claim 1, wherein the RAN deciding whether to allocate to the mobile station resources associated with both the first coverage area and the second coverage area or rather to allocate to the mobile station resources associated with just the first coverage area or the second coverage area comprises the RAN deciding whether or not to engage in an access handoff process with the mobile station.

6. The method of claim 1, wherein the at least one base station radiating to define the first coverage area and the second coverage area comprises a first base station that radiates to define the first coverage area and a second base station that radiates to define the second coverage area.

7. The method of claim 1,
   wherein the origination request comprises a call recovery request message (CRRM), and
   wherein the RAN makes the determination by identifying that the origination request comprises a CRRM.

8. The method of claim 1,
   wherein the origination request comprises an origination message, and
   wherein the RAN makes the determination by determining that a record of call drops stored by the RAN indicates that the mobile station experienced a call drop within the predetermined amount of time prior to receiving the origination message.

9. The method of claim 1, wherein the RAN deciding whether to allocate to the mobile station resources associated with both the first coverage area and the second coverage area or rather to allocate to the mobile station resources associated with just the first coverage area or the second coverage area comprises a base station controller deciding whether to allocate to the mobile station resources associated with both the first coverage area and the second coverage area or rather to allocate to the mobile station resources associated with just the first coverage area or the second coverage area.

10. A system in a radio access network (RAN), wherein the RAN comprises at least one base station radiating to define a first coverage area and a second coverage area, and wherein a mobile station is operating at a location where the first coverage area and the second coverage area overlap, the system comprising:
- a processor;
- data storage; and
- program instructions stored in the data storage and executable by the processor to carry out functions comprising:
  - (i) receiving an origination request from the mobile station,
  - (ii) in response to receiving the origination request, determining whether to allocate to the mobile station resources associated with both the first coverage area and the second coverage area or rather to allocate to the mobile station resources associated with just the first coverage area or the second coverage area, wherein the determination is based on an assessment of whether, within a predetermined amount of time prior to receiving the origination request, the mobile station experienced a call drop, wherein:
    - the determination is to allocate to the mobile station resources associated with both the first coverage area and the second coverage area if the assessment is that, within the predetermined amount of time prior to receiving the origination request, the mobile station did not experience a call drop, and
    - the determination is to allocate to the mobile station resources associated with just the first coverage area or the second coverage area if the assessment is that, within the predetermined amount of time prior to receiving the origination request, the mobile station experienced a call drop, and
  - (iii) in response to receiving the origination request, allocating resources to the mobile station in accordance with the decision.

11. The system of claim 10, wherein determining whether to allocate to the mobile station resources associated with both the first coverage area and the second coverage area or rather to allocate to the mobile station resources associated with just the first coverage area or the second coverage area comprises determining whether to send to the mobile station channel assignment messages for both the first coverage area and the second coverage area or rather to send to the mobile station a channel assignment message for just the first coverage area or the second coverage area.

12. The system of claim 10, wherein determining whether to allocate to the mobile station resources associated with both the first coverage area and the second coverage area or rather to allocate to the mobile station resources associated with just the first coverage area or the second coverage area comprises determining whether or not to engage in a Channel Assignment into Soft Handoff (CASHO) process with the mobile station.

13. The system of claim 10, wherein determining whether to allocate to the mobile station resources associated with both the first coverage area and the second coverage area or rather to allocate to the mobile station resources associated with just the first coverage area or the second coverage area comprises determining whether to allocate to the mobile station traffic channels for both the first coverage area and the second coverage area or rather to allocate to the mobile station a traffic channel from just the first coverage area or the second coverage area.

14. The system of claim 10, wherein determining whether to allocate to the mobile station resources associated with both the first coverage area and the second coverage area or rather to allocate to the mobile station resources associated with just the first coverage area or the second coverage area comprises determining whether or not to engage in an access handoff process with the mobile station.

15. The system of claim 10, wherein the at least one base station radiating to define the first coverage area and the second coverage area comprises a first base station that radiates to define the first coverage area and a second base station that radiates to define the second coverage area.

16. The system of claim 10,
wherein the origination request comprises a call recovery request message (CRRM), and
wherein the processor makes the assessment by identifying that the origination request comprises a CRRM.

17. The system of claim 10,
wherein the origination request comprises an origination message, and
wherein the processor makes the assessment by determining that a record of call drops stored by the RAN indicates that the mobile station experienced a call drop within the predetermined amount of time prior to receiving the origination message.

18. A method implemented by a radio access network (RAN) in a wireless communication system, the method comprising:
the RAN receiving an origination request from a mobile station;
in response to receiving the origination request, the RAN deciding how many traffic channels to allocate to the mobile station, wherein the decision is based on a determination of whether, within a predetermined amount of time prior to receiving the origination request, the mobile station experienced a call drop, wherein:
  (i) the RAN decides to allocate to the mobile station a first number of traffic channels if the determination is that, within the predetermined amount of time prior to receiving the origination request, the mobile station experienced a call drop, and
  (ii) the RAN decides to allocate to the mobile station a second number of traffic channels if the determination is that, within the predetermined amount of time prior to receiving the origination request, the mobile station did not experience a call drop, wherein the first number is less than the second number, and
in response to receiving the origination request, the RAN allocating to the mobile station either the first number of traffic channels or the second number of traffic channels in accordance with the decision.

19. The method of claim 18, wherein the RAN comprises at least one base station radiating to define a first coverage area and a second coverage area, wherein a mobile station is operating at a location where the first coverage area and the second coverage area overlap, and wherein the method further comprises:
the RAN deciding, based on the determination, whether to send to the mobile station channel assignment messages for both the first coverage area and the second coverage area or rather to send to the mobile station a channel assignment message for just the first coverage area or the second coverage area; and
the RAN sending one or more channel assignment messages to the mobile station in accordance with the decision, wherein the one or more channel assignment messages comprise data specifying either the first number of traffic channels or the second number of traffic channels.

20. The method of claim 18,
wherein the origination request comprises a call recovery request message (CRRM), and
wherein the RAN makes the determination by identifying that the origination request comprises a CRRM.

\* \* \* \* \*